United States Patent
Fang (10) Patent No.: US 11,303,020 B2
(45) Date of Patent: Apr. 12, 2022

(54) HIGH GAIN RELAY ANTENNA SYSTEM WITH MULTIPLE PASSIVE REFLECT ARRAYS

(71) Applicant: Metawave Corporation, Palo Alto, CA (US)

(72) Inventor: Jun Fang, Palo Alto, CA (US)

(*) Notice: Subject to any disclaimer, the term of this patent is extended or adjusted under 35 U.S.C. 154(b) by 62 days.

(21) Appl. No.: 16/520,286

(22) Filed: Jul. 23, 2019

(65) Prior Publication Data

US 2020/0028262 A1   Jan. 23, 2020

Related U.S. Application Data

(60) Provisional application No. 62/702,304, filed on Jul. 23, 2018.

(51) Int. Cl.
  *H01Q 3/46* (2006.01)
  *H01Q 15/14* (2006.01)
  *H04B 7/145* (2006.01)

(52) U.S. Cl.
  CPC ........... *H01Q 3/46* (2013.01); *H01Q 15/148* (2013.01); *H04B 7/145* (2013.01)

(58) Field of Classification Search
  None
  See application file for complete search history.

(56) References Cited

U.S. PATENT DOCUMENTS

| | | | |
|---|---|---|---|
| 7,142,164 B2* | 11/2006 | Legay | H01Q 3/46 343/754 |
| 2004/0110469 A1* | 6/2004 | Judd | G01S 19/25 455/15 |
| 2010/0302120 A1* | 12/2010 | Crouch | H01Q 3/46 343/837 |
| 2012/0099856 A1* | 4/2012 | Britz | H04B 10/90 398/26 |

OTHER PUBLICATIONS

J. Huang, et al., "Reflectarray Antennas," John Wiley & Sons, 2008.
O. M. Bucci, et al., "Antenna Pattern Synthesis: A New General Approach," Proceedings of the IEEE, vol. 82, No. 3, pp. 358-371, Mar. 1994.

(Continued)

*Primary Examiner* — Crystal L Hammond
(74) *Attorney, Agent, or Firm* — Sandra Lynn Godsey (57) ABSTRACT

Examples disclosed herein relate to a high gain relay antenna system that includes a first passive reflect array configured to receive electromagnetic radiation from a transmitting source and generate a transmit beamforming signal with a first gain from the electromagnetic radiation. The high gain relay antenna system also includes a second passive reflect array positioned at a predetermined distance from the first passive reflect array and configured to collimate phases of the transmit beamforming signal from the first passive reflect array and transmit an outbound beamforming signal with a second gain greater than the first gain, to a coverage area. Other examples disclosed herein relate to a dual-reflect array system and a method of high gain relay with multiple passive reflect array antennas.

20 Claims, 7 Drawing Sheets

(56) References Cited

OTHER PUBLICATIONS

O.M. Bucci, et al., "Intersection Approach to Array Pattern Synthesis," IEEE Proceedings—Microwaves, Antennas and Propagation, vol. 137, No. 6, pp. 349-357, Dec. 1990.
Daniel R. Prado et al., "Efficient Crosspolar Optimization of Shaped-Beam Dual-Polarized Reflectarrays Using Full-Wave Analysis for the Antenna Element Characterization," IEEE Transactions on Antennas and Propagation, vol. 65, No. 2, pp. 623-635, 2017.
Daniel R. Prado et al., "Improved Reflectarray Phase-Only Synthesis Using the Generalized Intersection Approach with Dielectric Frame and First Principle of Equivalence," International Journal of Antennas and Propagation, May 23, 2017.

* cited by examiner

FIG. 9

HIGH GAIN RELAY ANTENNA SYSTEM WITH MULTIPLE PASSIVE REFLECT ARRAYS

CROSS-REFERENCE TO RELATED APPLICATIONS

This application claims priority from U.S. Provisional Application No. 62/702,304, filed on Jul. 23, 2018, and incorporated by reference in its entirety.

BACKGROUND

New generation wireless networks are increasingly becoming a necessity to accommodate user demands. Mobile data traffic continues to grow every year, challenging the wireless networks to provide greater speed, connect more devices, have lower latency, and transmit more data at once. Users now expect instant wireless connectivity regardless of the environment and circumstances, whether it is in an office building, a public space, an open preserve, or in a vehicle on road, and so on. In response to these demands, a new wireless standard known as Fifth Generation (5G) has been designed for deployment. In particular, the 5G standard can operate at millimeter wavelengths, which covers frequencies between 30 GHz and 300 GHz.

The millimeter wave spectrum provides narrow wavelengths in the range of 1 to 10 millimeters that are susceptible to high atmospheric attenuation and have a short range (just over a kilometer). These and other challenges in providing millimeter wave wireless communications for 5G networks impose ambitious goals on system design, including the ability to generate desired beam forms at a controlled direction while avoiding interference among the many signals and structures of the surrounding environment.

BRIEF DESCRIPTION OF THE DRAWINGS

The present application may be more fully appreciated in connection with the following detailed description taken in conjunction with the accompanying drawings, which are not drawn to scale and in which like reference characters refer to like parts throughout, and wherein.

DETAILED DESCRIPTION

The wide millimeter wave bands allocated for 5G use, aiming at providing unprecedentedly large amounts of spectrum for deploying very high speed 5G services, are one of the most important developments in 5G. The millimeter wave signals, however, with shorter wavelengths in the range of 1 to 10 millimeters, are susceptible to high path loss and consequently can only support short ranges of about hundreds of meters in 5G millimeter wave small cell coverages. On the other hand, to overcome the large path loss, beamforming phase array antennas are used with high gain and narrow directional beams, radio coverage over a wide angle becomes difficult because of limited number of available beams. In addition, using smaller cells tend to increase the number of Access Points (AP) or Base Stations (BS), making the network planning cost prohibitively high. These new challenges in providing millimeter wave wireless communications for 5G networks jointly present considerable technical challenges but at the same time, provide new opportunities for innovations in system design and signal transmission and processing techniques, including the ability to generate desired beam forms at controllable directions while avoiding interference among the many signals and structures of the surrounding environment.

Due to the particularities of millimeter bands, numerous new technical issues remain to be solved. Network optimization technology in millimeter bands would drastically be evolved to overcome the highly challenging technical burdens due to the special propagation conditions as well as the particularities of the array antennas, together with their control and management protocols. Among several and different such efforts, relay using innovative passive devices has been considered as one of the most cost-effective technologies in the field of 5G network planning and optimization. In conventional relay systems, mechanically steered antennas are used without beam forming and steering capabilities, and active subsystems are also utilized to provide high power gain necessary to compensate the propagation loss, in addition to the relay antenna gain. Passive relay systems can use reflect arrays or transmit arrays, for special functionalities including beamforming in relayed direction, providing high performance at low cost. Reflect arrays are passive phased array antennas for beamforming in reflected direction of the incoming signals. Among numerous advantages of reflect array antennas, such as high performance with spatial beamforming without the need for power combining/dividing and feeding networks, and low cost and low weight, efficient manufacturability is also of particular importance for large scale deployment.

With reflect arrays, the incoming signals and the reflected beamformed signals are both propagated in predetermined three-dimensional (3D) angles in both azimuth and elevation. At the same time, since reflect arrays are passive devices, only beamforming gain is provided to the relay link and an additional performance loss would be observed when the incident angle and reflected angle are very large, in a similar way as the phased array antennas used in beam steering. In 5G millimeter band network, scenarios and use cases are to be considered where one single array would not be sufficient in circumstances of radio propagation scenarios where a high antenna gain is required considering the range and angles of the relay link. In this respect, the present disclosure provides for a system configuration based on at least two passive arrays, to provide a high gain, approximately twice than the conventional configurations with only one reflect array antenna. Given that reflect arrays may have a high performance/cost ratio, it will be shown that the passive relay applications of the subject technology possess some distinguished advantages to meet the extremely challenging relay requirements in millimeter bands for broadband signals, and all at very low cost. The subject technology based on a dual-reflect array configuration provides more flexibilities in deployments with more freedom in terms of the orientation and directions of the relayed signals.

The present disclosure provides for a high gain relay antenna system with multiple passive reflect arrays. The high gain relay antenna system is suitable for many different mm-wave applications and can be deployed in a variety of different environments and configurations. Mm-wave applications are those operating with frequencies between 30 GHz and 300 GHz or a portion thereof, including 5G applications in the 24 GHz, 28 GHz, 39 GHz, and possibly 60 GHz, 70 GHz and 80 GHz range, among others. In various examples, the high gain relay antenna system provides a high gain reflection of a wireless signal to connect wireless devices such as User Equipment (UE) that are operational in complicated environments, including outdoors with obstructing structures (e.g., skyscrapers, buildings, trees, etc.) and non-line-of-sight areas and indoors with walls and constructs. Indoor scenarios are highly complex and equally challenging as outdoors, but also very important because the traffic density requirements are usually higher. The high gain relay antenna system can receive a broadcast signal from a transmitter, such as a base station and generate high gain reflections through multiple paths and having different transmission beams. The ability to initiate a directed transmission with multiple devices provides a way for a network operator to provide ubiquitous coverage, and vastly improve coverage.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced using one or more implementations. In one or more instances, structures and components are shown in block diagram form in order to avoid obscuring the concepts of the subject technology. In other instances, well-known methods and structures may not be described in detail to avoid unnecessarily obscuring the description of the examples. Also, the examples may be used in combination with each other.

Figure 1:
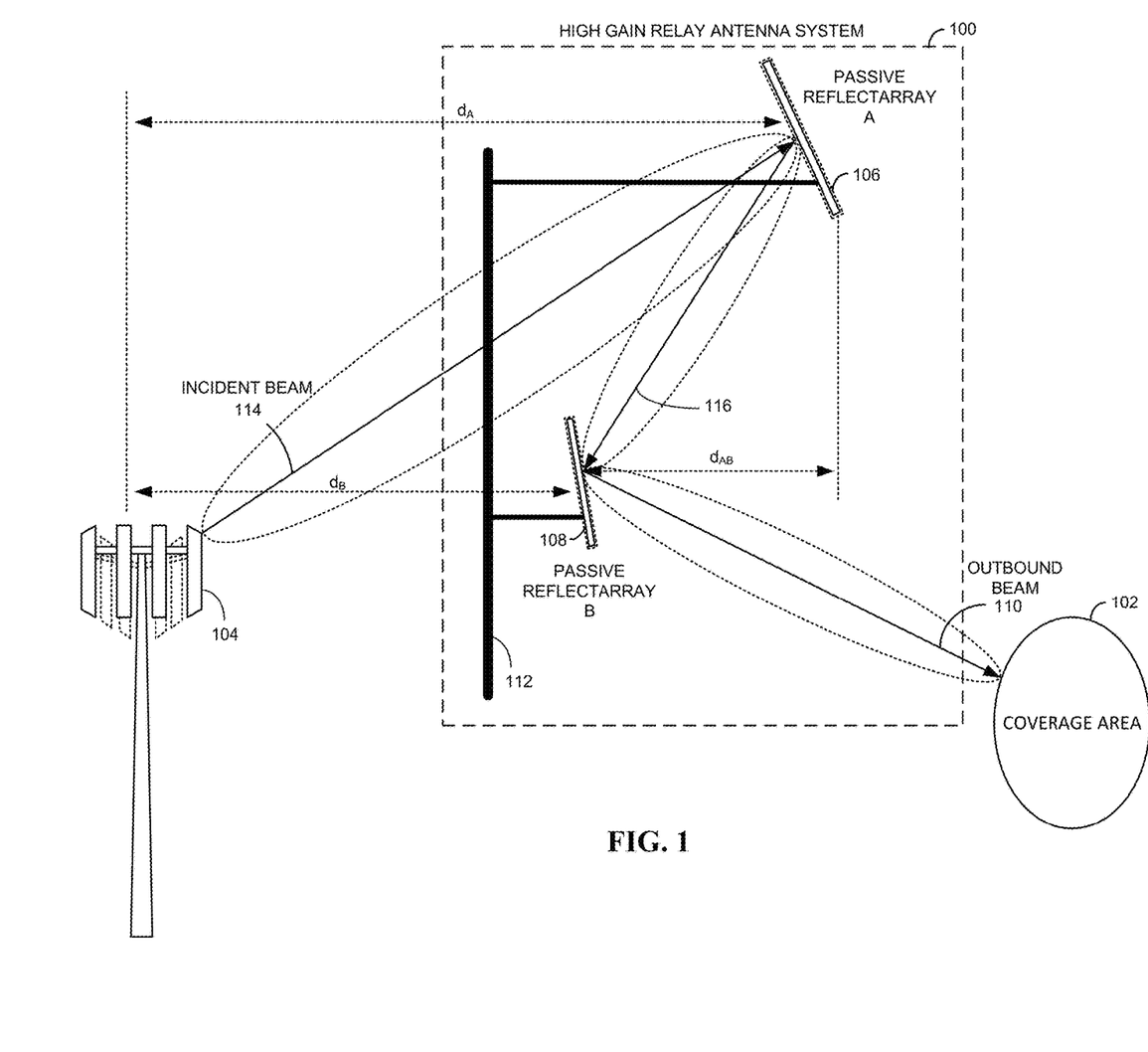
FIG. 1 illustrates a schematic diagram of a high gain relay antenna system for use in a wireless network in accordance with various implementations of the subject technology.

FIG. 1 illustrates a schematic diagram of a high gain relay antenna system 100 for use in a wireless network in accordance with various implementations of the subject technology. The high gain relay antenna system 100 includes a first passive reflect array 106 (depicted as Passive Reflect Array A) and a second passive reflect array 108 (depicted as Passive Reflect Array B). Not all of the depicted components may be used, however, and one or more implementations may include additional components not shown in the figure. Variations in the arrangement and type of the components may be made without departing from the scope of the claims set forth herein. Additional components, different components, or fewer components may be provided.

The high gain relay antenna system 100 is used in a wireless network to provide ubiquitous coverage to a coverage area 102. The high gain relay antenna system 100 and the coverage area 102 may be indoors or outdoors as a part of a wireless network, such as a 5G network that operates in the frequency spectrum from 26 GHz to 30 GHz or another spectrum designated for wireless transmission. A transmitter, such as BS 104, transmits wireless signals to UEs and wireless devices in a given area, including the coverage area 102. Depending on the environment and structures in the environment, wireless signals from BS 104 may suffer from propagation loss and interference that degrade the quality and strength of the signals and the overall performance of the wireless experience for users in the coverage area 102. With the high gain relay antenna system 100 in place, such transmission performance and quality degradations are eliminated or at least minimized.

The high gain relay antenna system 100 is composed of multiple passive reflect arrays, namely the first passive reflect array 106 and the second passive reflect array 108. In the illustrated example, the first passive reflect array 106 and the second passive reflect array 108 are separated by a distance of $d_{AB}$ and geometrically positioned relative to each other and to the BS 104 to generate a high gain beamforming signal 110 to reach the coverage area 102. The first passive reflect array 106 and the second passive reflect array 108 are coupled to a mount 112 and respectively distanced from the BS 104 by distances $d_A$ and $d_B$. The distances $d_A$, $d_B$ and $d_{AB}$ are predetermined based on the environment of and around the coverage area 102, the wireless capabilities of the BS 104 and its network, and obstacle configurations in the environment. In some aspects, the distance $d_A$ is greater than the distance $d_B$.

In some implementations, each of the first passive reflect array 106 and the second passive reflect array 108 may be, or include at least a portion of, a Frequency Selective Surface ("FSS") reflect array capable of providing high gain wireless signals efficiently, at a low cost and without using active devices such as Low Noise Amplifiers ("LNAs") or Power Amplifiers ("PAs"). In some aspects, channel filtering functions may be excluded from the high gain relay antenna system 100 based at least on inherent frequency selectivity properties of the first passive reflect array 106 and the second passive reflect array 108. The dual-reflect array configurations in the high gain relay antenna system 100 can help to avoid spatial interference because the first passive reflect array 106 and the second passive reflect array 108 can be optimally placed for the optimum orientations with both BS and UE coverage areas.

In operation, the BS 104 transmits a transmit signal 114 (depicted as the incident beam) that is received by the passive reflect array 106 and then reflected as a transmit beamforming signal 116. Based on the geometrical configuration of the first passive reflect array 106 and the second passive reflect array 108, the transmit beamforming signal 116 is received by the second passive reflect array 108 and reflected as the high gain beamforming signal 110 (depicted as the outbound beam), reaching the coverage area 102. Note that while described with respect to a wireless network with BS 104 for clarity of understanding, the high gain relay antenna system 100 is applicable to other wireless systems, networks and environments, where obstacles and environmental features may impede or affect communications resulting in non-line-of-sight areas or dead zones.

Figure 2:
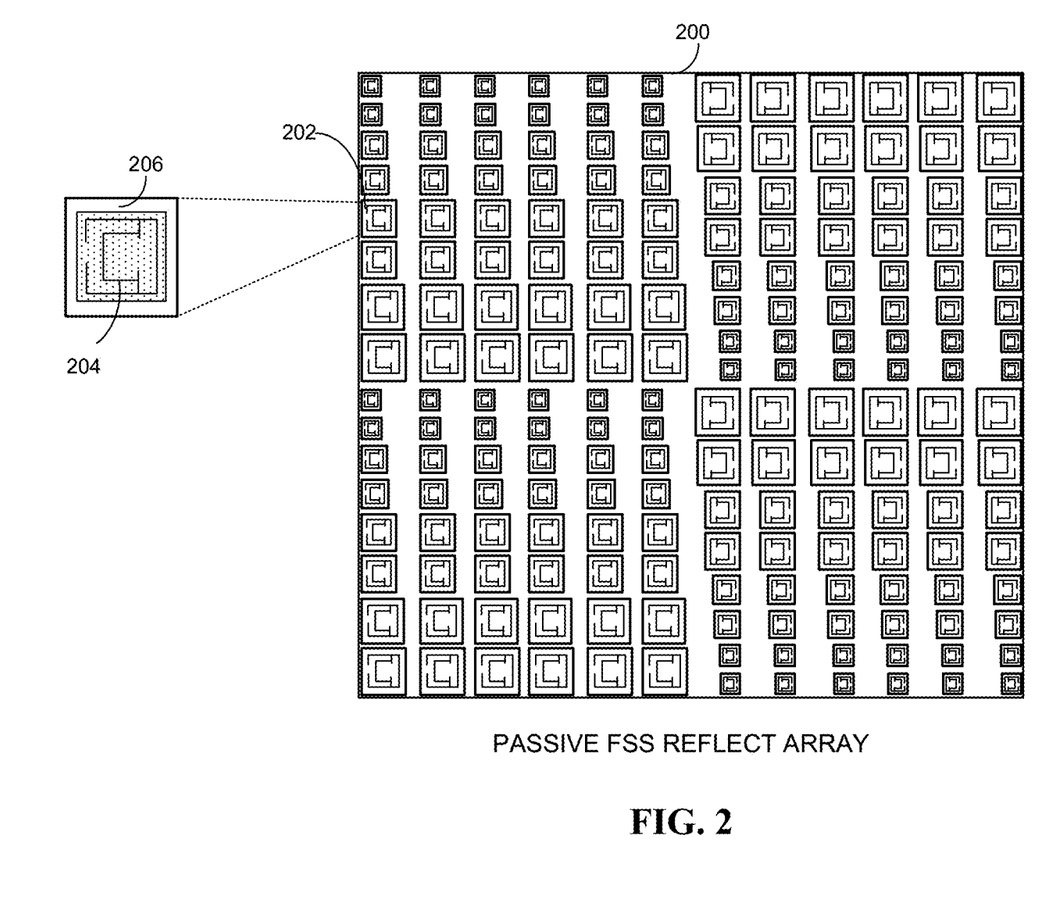
FIG. 2 illustrates a schematic diagram of an example passive reflect array for use with the high gain relay system of FIG. 1 in accordance with various implementations of the subject technology.

FIG. 2 illustrates a schematic diagram of an example passive reflect array 200 for use with the high gain relay antenna system 100 of FIG. 1. The passive reflect array 200 includes a periodic array of conductive cells forming an FSS. In some implementations, the conductive cells are composed of apertures, reflectors, microstrips, gaps, patches, or the like. As illustrated in FIG. 2, each of the conductive cells includes a patch element 202. The patch element 202 may have different layout configurations, such as a square patch element, a rectangular patch element, a dipole patch element, a miniature patch element, and the like. The conductive cells may have a rectangular shape; however, other shapes may also be implemented to satisfy a design criteria for a given 5G application, such as the location of the reflect array relative to a wireless radio, the design gain and directivity performance, and the like. In some implementations, the conductive cells have dimensions that are in the sub-wavelength range (e.g., $\lambda/3$), where $\lambda$ refers to the wavelength of its incident or reflected electromagnetic (EM) radiation (e.g., radio wave signals). Various configurations, shapes, and dimensions may be used to implement specific designs and to meet specific constraints without departing from the scope of the present disclosure.

In some implementations, the passive reflect array 200 includes a dielectric layer interposed between two conductive layers, namely a ground plane layer and a patterned conductive layer. In some aspects, the patterned conductive layer can be etched to form the patch elements 202 on a top surface of the patterned conductive layer. In other aspects, the patch element 202 can be deposited on the top surface of the patterned conductive layer. The patterned conductive layer may be formed of a metallic material, such as copper. In this respect, each patch element 202 may be formed of a conductive portion 204 of the patterned conductive layer and a dielectric portion 206 of the dielectric layer.

In operation, the passive reflect array 200 receives input EM radiation on its surface at a certain direction of arrival in azimuth and elevation. The input EM radiation is reflected from the patch elements 202 of the passive reflect array 200 to form reflected EM radiation with a specific phase shift applied by the patch element 202. The reflected EM radiation from the patch elements 202 can be phase-aligned in space, thus generating a transmit beamforming signal with a transmit gain. The configuration of the patch element 202 is shown for illustration and example purposes; other configurations of materials and arrangements of elements in a passive reflect array may be used to achieve the desired transmit beamforming.

In some implementations, the passive reflect array 200 is an array of meta-structure (MTS) cells with uniform size and shape; however, some examples may incorporate different sizes, shapes, configurations and array sizes without departing from the scope of the present disclosure. Each MTS cell may include a conductive outer portion or loop surrounding a conductive area with a space in between. Each MTS cell may be configured on a dielectric layer, with the conductive areas and loops provided around and between different cells. A meta-structure, as generally defined herein, is an engineered, non- or semi-periodic structure that is spatially distributed to meet a specific phase and frequency distribution. The MTS cell can be used to control and manipulate physical phenomena, such as the EM properties of a signal including its amplitude, phase, and wavelength.

The MTS cells may behave as derived from inherent properties of their constituent materials, as well as from the geometrical arrangement of these materials with size and spacing that are much smaller relative to the scale of spatial variation of typical applications. An MTS cell may be composed of multiple microstrips, gaps, patches, vias, and so forth, having a behavior that is the equivalent to a reactance element, such as a combination of series capacitors and shunt inductors. Various configurations, shapes, designs and dimensions are used to implement specific designs and meet specific constraints. In some examples, the number of dimensional freedom determines the characteristics, in which a device having a number of edges and discontinuities may model a specific type of electrical circuit and behave in a similar manner. In this respect, an MTS cell radiates according to its configuration. Where the radiation pattern is changed to achieve a phase change or phase shift, the resultant structure is a powerful antenna, as small changes to the MTS cell can result in large changes to the beamform.

The MTS cells include a variety of conductive structures and patterns, such that a received EM wave signal is radiated therefrom. In various examples, each MTS cell has some unique properties. These properties may include a negative permittivity and permeability resulting in a negative refractive index; these structures are commonly referred to as left-handed materials ("LHM"). The use of LHM enables behavior not achieved in classical structures and materials, including interesting effects that may be observed in the propagation of EM waves, or transmission signals.

In some implementations, the meta-structures include metamaterials. A metamaterial is not a tangible new material, but rather is a geometric design of known materials, such as conductors, that behave in a specific way. Metamaterials can be used for several interesting devices in microwave and terahertz engineering such as antennas, sensors, matching networks, and reflectors, such as in telecommunications, automotive and vehicular, robotic, biomedical, satellite and other applications. For antennas, metamaterials may be built at scales much smaller than the wavelengths of transmission signals radiated by the metamaterial. Metamaterial properties come from the engineered and designed structures rather than from the base material forming the structures. Precise shape, dimensions, geometry, size, orientation, arrangement and so forth result in the smart properties capable of manipulating EM waves by blocking, absorbing, enhancing, or bending waves.

Figure 3:
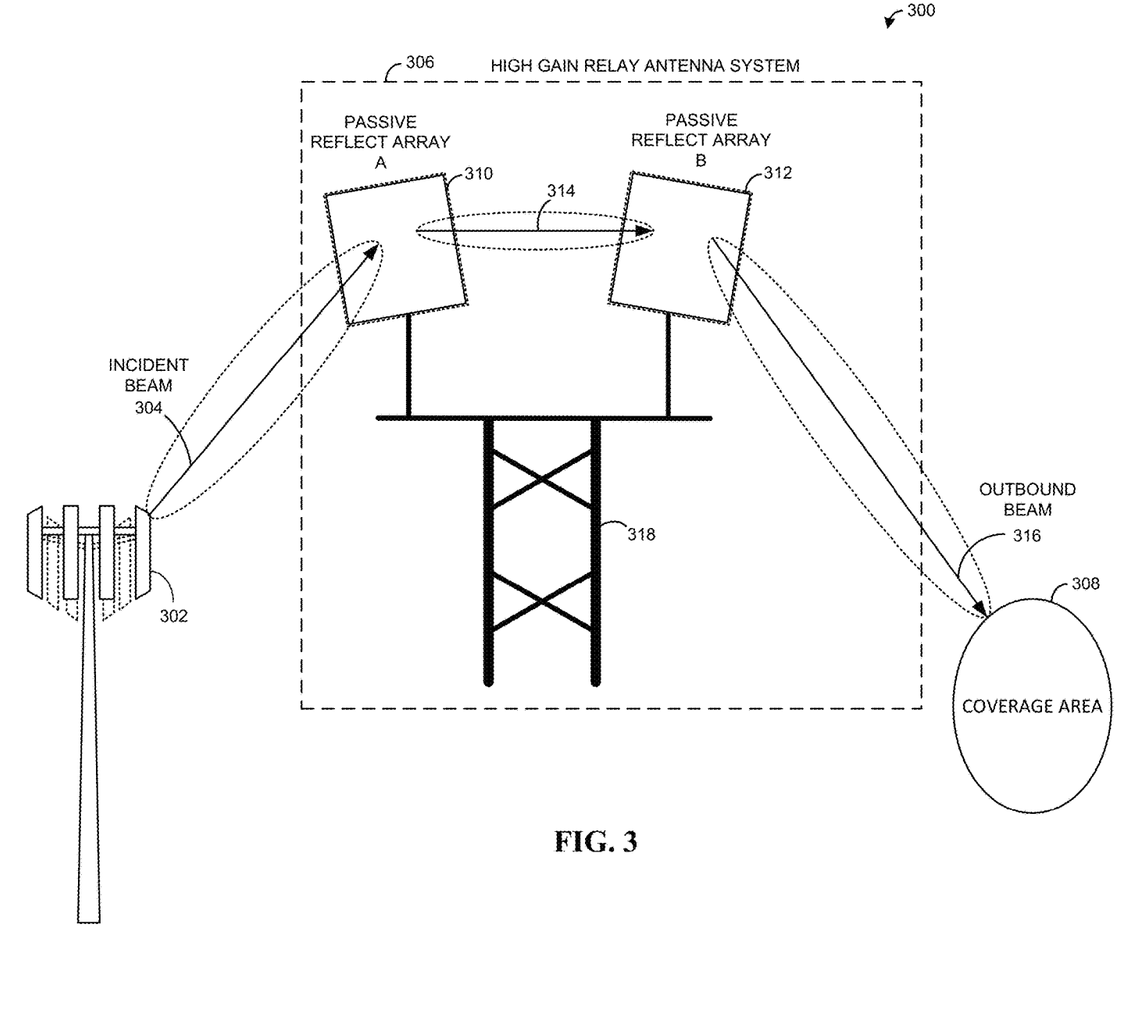
FIG. 3 illustrates another example configuration of a high gain relay antenna system for use in a wireless network in accordance with various implementations of the subject technology.

Attention is now directed to FIG. 3, which illustrates another example configuration of a high gain relay antenna system 306 for use in a wireless network 300. The wireless network 300 includes a BS 302 providing wireless communication service to a coverage area 308 via the high gain relay antenna system 306. The high gain relay antenna system 306 includes two passive reflect arrays, namely the first passive reflect array 310 (depicted as passive reflect array A) and the second passive reflect array 312 (depicted as passive reflect array B), mounted onto a mount 318. The first passive reflect array 310 and the second passive reflect array 312 may be FSSs formed of an array of patch elements or MTS cells depending on implementation. As illustrated in FIG. 3, the first passive reflect array 310 is positioned closest to the BS 302 compared to the second passive reflect array 312, and is orientated relative to the BS 302 such that the first passive reflect array 310 can obtain EM signaling from the BS 302 and redirect it toward the second passive reflect array 312. The second passive reflect array 312 is positioned closest to the coverage area 308 compared to the first passive reflect array 310, and is orientated relative to the coverage area 308 such that the second passive reflect array 312 can obtain reflected EM signaling from the first passive reflect array 310 and redirect it toward the coverage area 308. The positions of the first passive reflect array 310 and the second passive reflect array 312 relative to the mount 318, the BS 302 and the coverage area 308, as well as their design parameters such as the shape and size of the patch elements and the number of patch elements in each of the passive reflect arrays, are determined based on the environment in and around the coverage area 308, the wireless capabilities of the BS 302 and the wireless network 300, and obstacle configurations in the environment.

In the wireless network 300, the BS 302 provides a transmission signal 304 (depicted as incident beam) to the high gain relay antenna system 306 for reaching the coverage area 308. The first passive reflect array 310 obtains the transmission signal 304 transmitted by the BS 302 and emits a transmit beamforming signal 314 from the transmission signal 304. The transmit beamforming signal 314 is transmitted over a predetermined distance to the second passive reflect array 312, where the transmit beamforming signal 314 is reflected from a surface of the second passive reflect array 312 as a high-gain beamforming signal 316 for transmission to the coverage area 308. The first passive reflect array 310 and the second passive reflect array 314 individually perform a reflector-type operation to provide coverage to the coverage area 308 and other areas within the wireless network 300. The reflector-type operation is similar to that performed by a repeater or other device to extend the wireless range (or reach) of a wireless transmitter, e.g., BS 302. In some aspects, the transmit beamforming signal 314 is a phase-shifted version of the transmission signal 304, such that the gain of the transmit beamforming signal 314 may be greater than that of the transmission signal 304. In other aspects, the high-gain beamforming signal 316 is a phase-shifted version of the transmit beamforming signal 314, such that the gain of the high-gain beamforming signal 316 may be greater than that of the transmit beamforming signal 314. As a result, the coverage area 308 receives a radio wave signal from the high-gain beamforming signal 316 that has a relatively high gain compared to the transmission signal 304. Both the transmit beamforming signal 314 and the high gain beamforming signal 316 may have beamforming characteristics and parameters (e.g., gain, shape, phase, etc.) that depend on their design and configuration for the wireless network 300.

Figure 4:
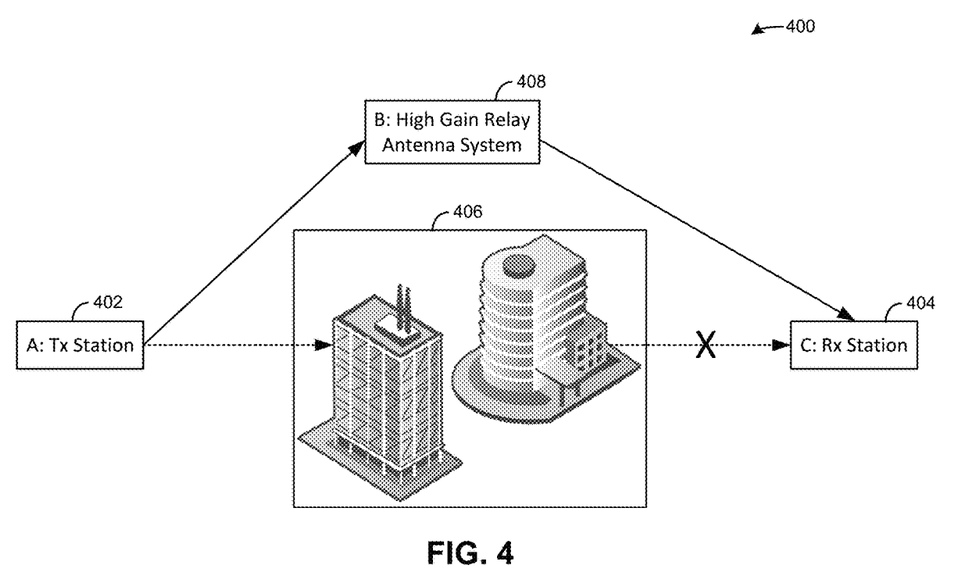
FIG. 4 illustrates a schematic diagram showing a high gain relay antenna system in an example environment and configuration in accordance with various implementations of the subject technology.

FIG. 4 illustrates a schematic diagram of an example of a high gain relay antenna system 408 in an example environment 400 and configuration in accordance with various implementations of the subject technology. The example environment 400 includes a transmitter station 402 (depicted as "A: Tx Station") and a receiver station 404 (depicted as "C: Rx Station") with obstructing structures 406 interposed between the transmitter station 402 and the receiver station 404. The obstructing structures 406 may include infrastructure (e.g., high rise buildings), vegetation, or other types of objects that may be obstructive. As illustrated in FIG. 4, the path between the transmitter station 402 and the receiver station 404 is obstructed by the obstructing structures 406 (depicted as the broken dashed line). The high gain relay antenna system 408 (depicted as "B: High Gain Relay Antenna System") is positioned between the transmitter station 402 and the receiver station 404, and is laterally distanced from the obstructing structures 406, such that the high gain relay antenna system 408 is substantially centered between the transmission station 402 and the receiver station 404 and has line-of-sight paths to the transmitter station 402 and the receiver station 404. In the illustrated example, the angle of reflection between the transmitter station 402 and the receiver station 404 via the high gain relay antenna system 408 is a non-acute turning angle (e.g., greater than 90°). The positioning of the high gain relay antenna system 408 enables the transmitter station 402 to provide wireless coverage to the receiver station 404 at a high gain, and therefore, achieve the desired performance and wireless experience to users.

Figure 5:
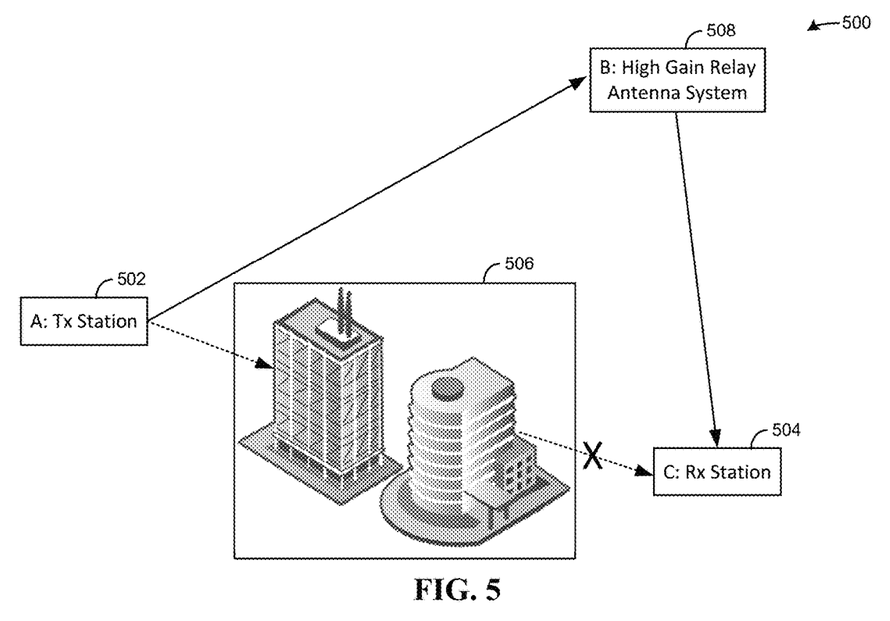
FIG. 5 illustrates a schematic diagram showing a high gain relay antenna system in another example environment and configuration in accordance with various implementations of the subject technology.

FIG. 5 illustrates a schematic diagram of an example of a high gain relay antenna system in another example environment 500 and configuration in accordance with various implementations of the subject technology. The example environment 500 includes a transmitter station 502 (depicted as "A: Tx Station") and a receiver station 504 (depicted as "C: Rx Station") with obstructing structures 506 interposed between the transmitter station 502 and the receiver station 504. The obstructing structures 506 may include infrastructure (e.g., high rise buildings), vegetation, or other types of objects that may be obstructive. As illustrated in FIG. 5, the path between the transmitter station 502 and the receiver station 504 is obstructed by the obstructing structures 506 (depicted as the broken dashed line). The high gain relay antenna system 508 (depicted as "B: High Gain Relay Antenna System") is positioned between the transmitter station 502 and the receiver station 504, and is laterally distanced from the obstructing structures 506, such that the high gain relay antenna system 508 is positioned closest to the receiver station 504 (compared to the transmitter station 502) and has line-of-sight paths to the transmitter station 502 and the receiver station 504. In the illustrated example, the angle of reflection between the transmitter station 502 and the receiver station 504 via the high gain relay antenna system 508 is an acute turning angle (e.g., greater than 0° and lesser than 90°). The positioning of the high gain relay antenna system 508 enables the transmitter station 502 to provide wireless coverage to the receiver station 504 at a high gain, and therefore, achieve the desired performance and wireless experience to users.

Figure 6:
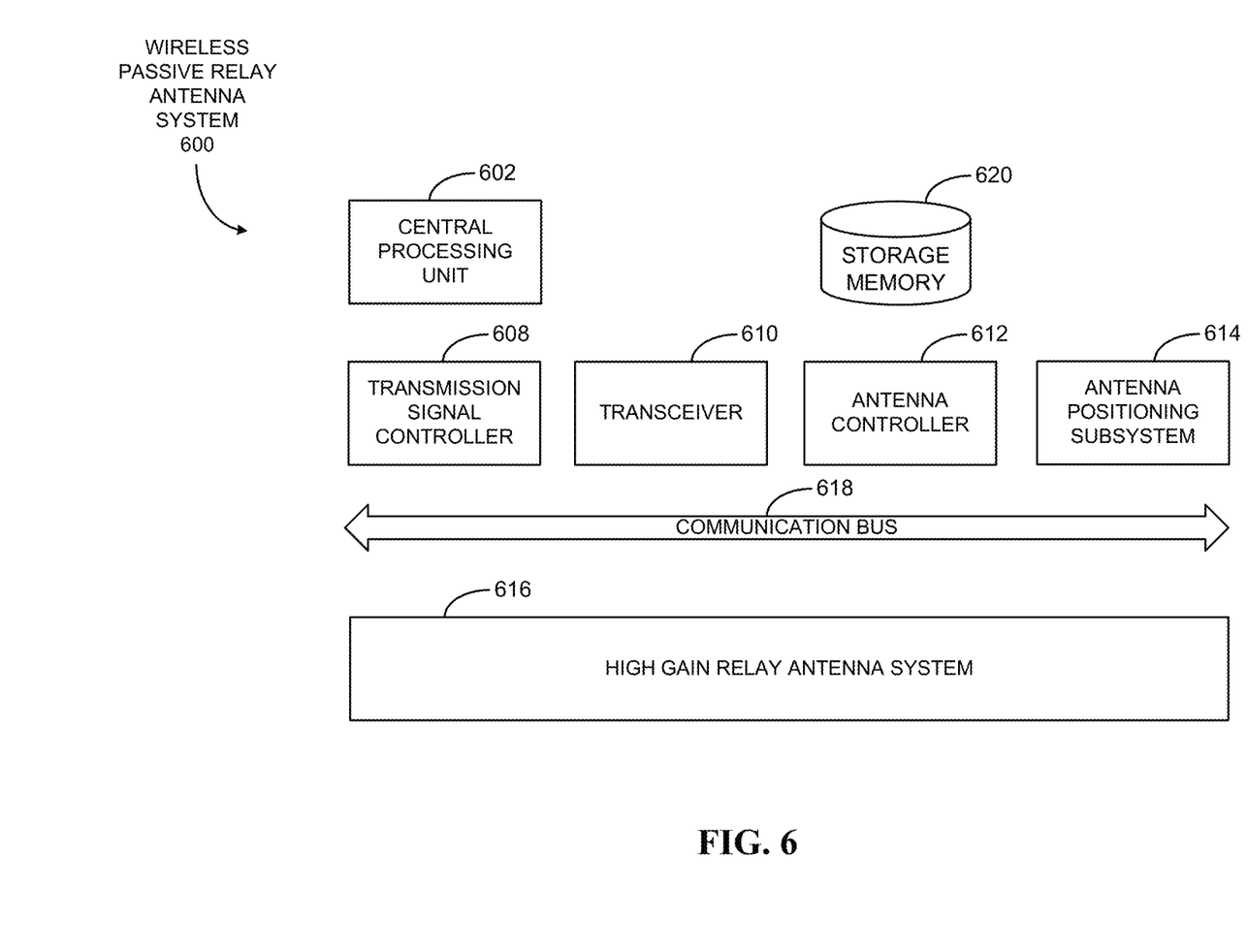
FIG. 6 illustrates a schematic diagram of a wireless system for use with a high gain relay antenna system in accordance with various implementations of the subject technology.

FIG. 6 illustrates a schematic diagram of a wireless passive relay antenna system 600 with remote control, in accordance with various implementations of the subject technology. The wireless passive relay antenna system 600 includes a central processing unit (CPU) 602, a transmission signal controller 608, a transceiver 610, an antenna controller 612, an antenna positioning subsystem 614, and a memory storage unit 620. Not all of the depicted components may be used, however, and one or more implementations may include additional components not shown in the figure. Variations in the arrangement and type of the components may be made without departing from the scope of the claims set forth herein. Additional components, different components, or fewer components may be provided.

The wireless passive relay antenna system 600 is communicably coupled to a high gain relay antenna system 616 through a communication bus 620. In some aspects, the high gain relay antenna system 616 is coupled to the CPU 602, the transmission signal controller 608, the transceiver 610, the antenna controller 612, and the antenna positioning subsystem 614 via the communication bus 618.

The transmission signal controller 608 receives command signals from, and transmits status report signaling, to network control station(s), according to control protocols such as Simple Network Management Protocol (SNMP). In some implementations, the transmission signal controller 608 generates a specific transmission signal with a specific modulation type. For example, the transmission signal controller 608 may generate a cellular modulated signal, such as an Orthogonal Frequency Division Multiplexing (OFDM) signal, which may be used for 5G applications. Other modulation types may be incorporated according to the desired information and specifications of a system and application. The received information, such as a transmission signal from a base station or a transmit beamforming signal from a first passive reflect array, is stored in the memory storage unit 820. In some systems, the transmission signal is provided to the wireless passive relay antenna system 600 and the transmission signal controller 608 may act as an interface, translator or modulation controller, or otherwise as required for the transmission signal to propagate through a transmission line network of the high gain relay antenna system 616.

The transceiver 610 is a radio module that transmits and receives control, monitoring, and maintenance data of the wireless passive relay antenna system 600 within a network. The transceiver 610 may be based on cellular standards, such as GSM/EPRS, 4G-LTE or 5G NR, or one of Internet-of-Things (IoT) nodes, either standardized such as 3GPP NB-IoT, or standalone, used for the same purposes.

The antenna controller 612 can control the generation and reception of electromagnetic radiation, or energy beams. The antenna controller 612 determines the direction, power and other parameters of the beams and controls the high gain relay antenna system 616 to achieve high gain beam forming in various directions. The antenna controller 612 may be used to interface with the antenna positioning subsystem 614, which can be either mechanical or electronic, to control the wireless passive relay antenna system 600 for maintaining the antenna direction and/or orientation and correction.

The CPU 602 and the memory storage unit 620 are utilized for autonomous operations of the wireless passive relay antenna system 600, possibly with an autonomous power supply based on a solar panel with a rechargeable battery.

In some cases, monitoring, alarming, and controllability of the wireless passive relay antenna system 600 may be required for a public wireless cellular network, and FIG. 6 presents the auxiliary functionalities that would be associated with the wireless passive relay antenna system 600.

In some implementations, the high gain relay antenna system 616 includes two reflectors as illustrated in FIGS. 1 and 3. The reflectors may be passive FSS reflect arrays and include MTM cells. In other examples, the high gain relay antenna system 616 may include multiple reflectors of a different type (e.g., array of patch elements). The geometry configuration of the reflectors relative to each other and relative to a corresponding transmitter station and coverage area(s) depends on the desired transmission characteristics, the transmission characteristics of the transmitter station and the positioning of the coverage area. It is appreciated that numerous configurations of the high gain relay antenna system 616 may be implemented in the wireless passive relay antenna system 600. It is also appreciated that the high gain relay antenna system 616 is applicable to numerous wireless applications, including broadband communication systems, automotive systems with artificial intelligence capabilities, medical and emergency information systems, and so on.

In some examples, the high gain relay antenna system 616 can be implemented in many applications, including radar, cellular antennas, and autonomous vehicles to detect and identify targets in the path of, or surrounding, the vehicle. Alternate examples may use the high gain relay antenna system 616 for medical equipment, sensing, monitoring, and so forth. Each application type incorporates designs and configurations of the elements, structures and modules described herein to accommodate their needs and goals. Alternate examples may reconfigure and/or modify the antenna structure to improve signal characteristics, antenna performance and so forth. The antenna performance may be adjusted by design of the antenna's features and materials, such as the shape of the FSS patches, patterns, dimensions, and so forth.

Figure 7:
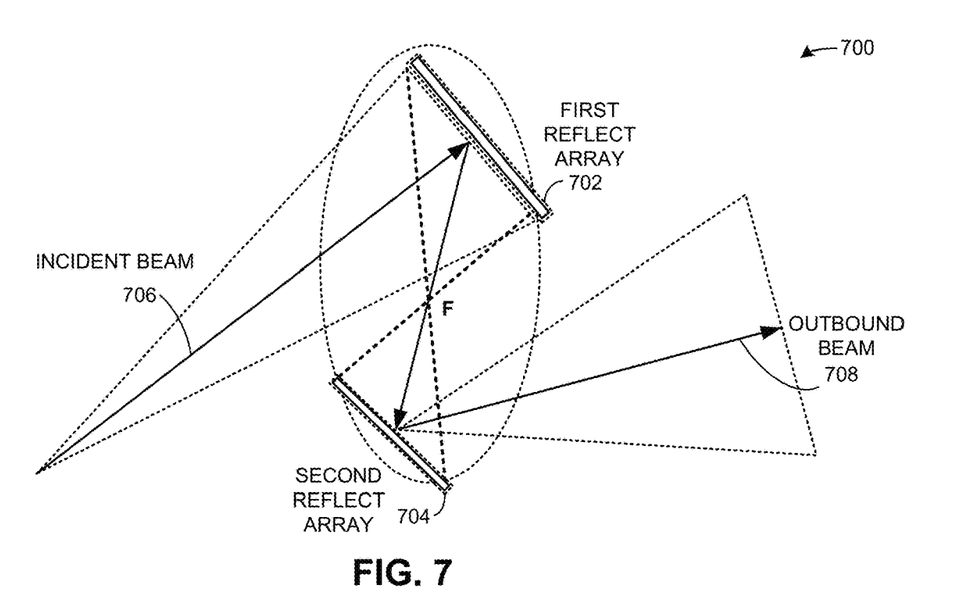
FIG. 7 conceptually illustrates a diagram of an example of a first relay antenna system configuration in accordance with various implementations of the subject technology.

FIG. 7 conceptually illustrates a diagram of an example of a first reflect array configuration 700 in accordance with various implementations of the subject technology. The first reflect array configuration 700 includes a first reflect array 702 and a second reflect array 704. The first reflect array 702 is positioned relative to the second reflect array 704 such that the reflection surface of the first reflect array 702 is facing toward the reflection surface of the second reflect array 704. In this respect, an incident beam 706 is emitted onto the reflection surface of the first reflect array 702 from an incident angle and reflected as a transmit beamforming signal to the reflection surface of the second reflect array 704, which is then reflected as an outbound beam 708 at an outbound angle. As illustrated in FIG. 7, the difference between the incident angle and the outbound angle is acute (or less than 90 degrees).

Figure 8:
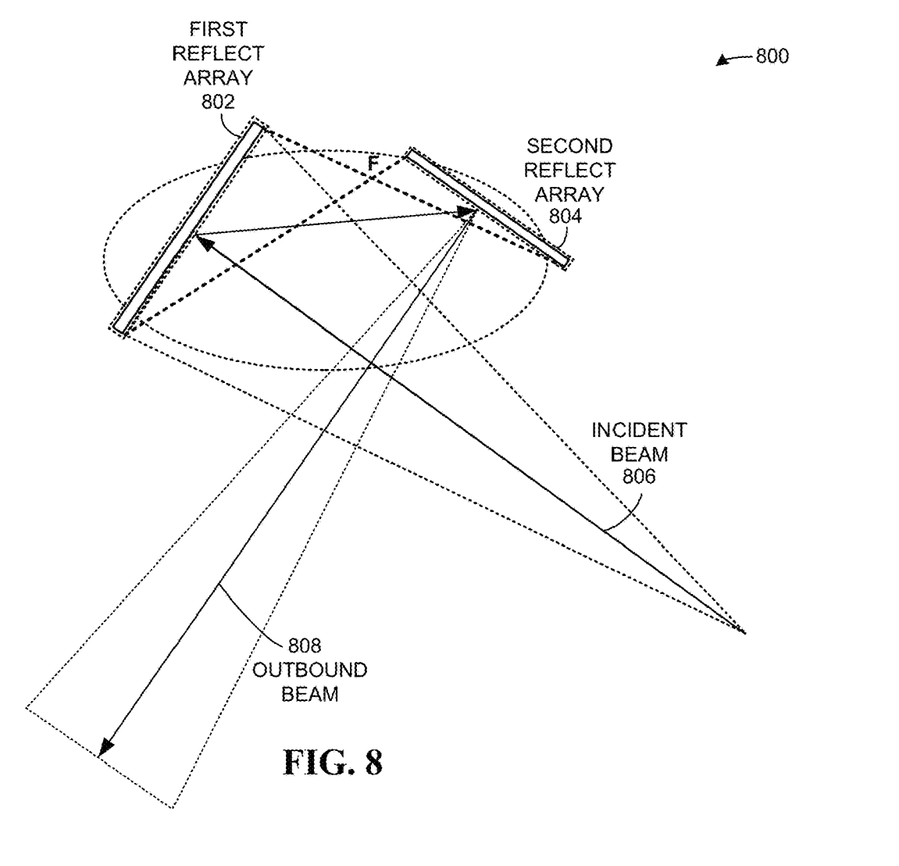
FIG. 8 conceptually illustrates a diagram of an example of a second relay antenna system configuration in accordance with various implementations of the subject technology.

FIG. 8 conceptually illustrates a diagram of an example of a second reflect array configuration 800 in accordance with various implementations of the subject technology. The second reflect array configuration 800 includes a first reflect array 802 and a second reflect array 804. The first reflect array 802 is positioned relative to the second reflect array 804 such that the reflection surface of the first reflect array 802 is substantially orthogonal to the reflection surface of the second reflect array 804. In this respect, an incident beam 806 is emitted onto the reflection surface of the first reflect array 802 from an incident angle and reflected as a transmit beamforming signal to the reflection surface of the second reflect array 804, which is then reflected as an outbound beam 808 at an outbound angle. As illustrated in FIG. 8, the difference between the incident angle and the outbound angle is non-acute (or greater than 90 degrees).

As shown in in FIG. 7 and FIG. 8, two reflect arrays are employed to implement a dual-reflect array system in each of the first reflect array configuration 700 and the second reflect array configuration 800. In the case of a downlink relay or feed-link relay, as illustrated in FIG. 7, the first reflect array 702 receives the incident beam 706 from a base station (not shown), and performs a transmit beamforming operation that points to the second reflect array 704, which in turn, upon receiving a beamformed signal from the first reflect array 702, the second reflect array 704 performs another transmit beamforming operation, resulting in the outbound beam 708 pointing to a UE or Customer Premises Equipment (CPE) (not shown). In the case of an uplink relay or service link relay, as illustrated in FIG. 8, the first reflect array 802 receives the incident beam 806 from either a UE or a CPE (not shown), and performs a transmit beamforming operation that points to the second reflect array 804, which in turn, upon receiving a beamformed signal from the first reflect array 802, the second reflect array 804 performs another transmit beamforming operation, resulting in the outbound beam 808 pointing to the base station (BS) or access point (AP).

In some implementations, a process of forming a dual-reflect array antenna system consists of the following. The reflect array may be excited from a near-field feed at a relatively short range, which may be equivalent to the focal length. It is required that the signals received at all of the reflect array elements are phase-shifted so that once reflected, the phase-shifted signals are aligned with each other for a specified reflected beam pattern that is realized in a far-field. The elements of the reflect array can introduce a phase shift that is predetermined by a phase distribution, which is calculated from the outbound beam (e.g., 708, 808) requirements in direction and beam-width. The phases of the reflected signals from the reflect array elements may be collimated by the phase shifts introduced by the reflect array elements, which are calculated based on 1) the reflect array geometry, 2) from the product of the free space wavenumber with the distances between the reflect array elements being relative to a respective reference element, and 3) offset by the outbound beam center angle. The reference point may correspond to the center of the reflect array.

In a first step of the process, the receive reflect array is specified and designed. The process of forming the receive reflect array of the subject technology uses a reverse methodology, which receives an incident beam from far-field and forms a reflected beam in near-field to illuminate the transmit reflect array. The phase distribution of the first reflect array, or receive reflect array, is determined by the incident angle and the array geometry. In a second step of the process, the second reflect array, or transmit reflect array, is designed according to the outbound beam specification, in terms of gain, beam-width and direction (e.g., azimuth angle and elevation angle).

In some implementations, a precondition for the dual-reflect array system to provide a high power gain is that all the signals reflected by the first reflect array (e.g., 702, 802) are collimated in phase at a virtual focal point "F" as shown in FIG. 7 and FIG. 8, and the reflected signals are then received by each of the elements of the second reflect array (e.g., 704, 804). In some aspects, any of these reflected signals is then propagated to all the elements of the second reflect array (e.g., 704, 804) as if they were sent from a virtual feed located at point "F". The second reflect array (e.g., 704, 804) collimates the phases and performs another transmit beamforming with its outbound beam (e.g., 708, 808). In this respect, the virtual focal point "F" can be used for designing both reflect array antennas.

Figure 9:
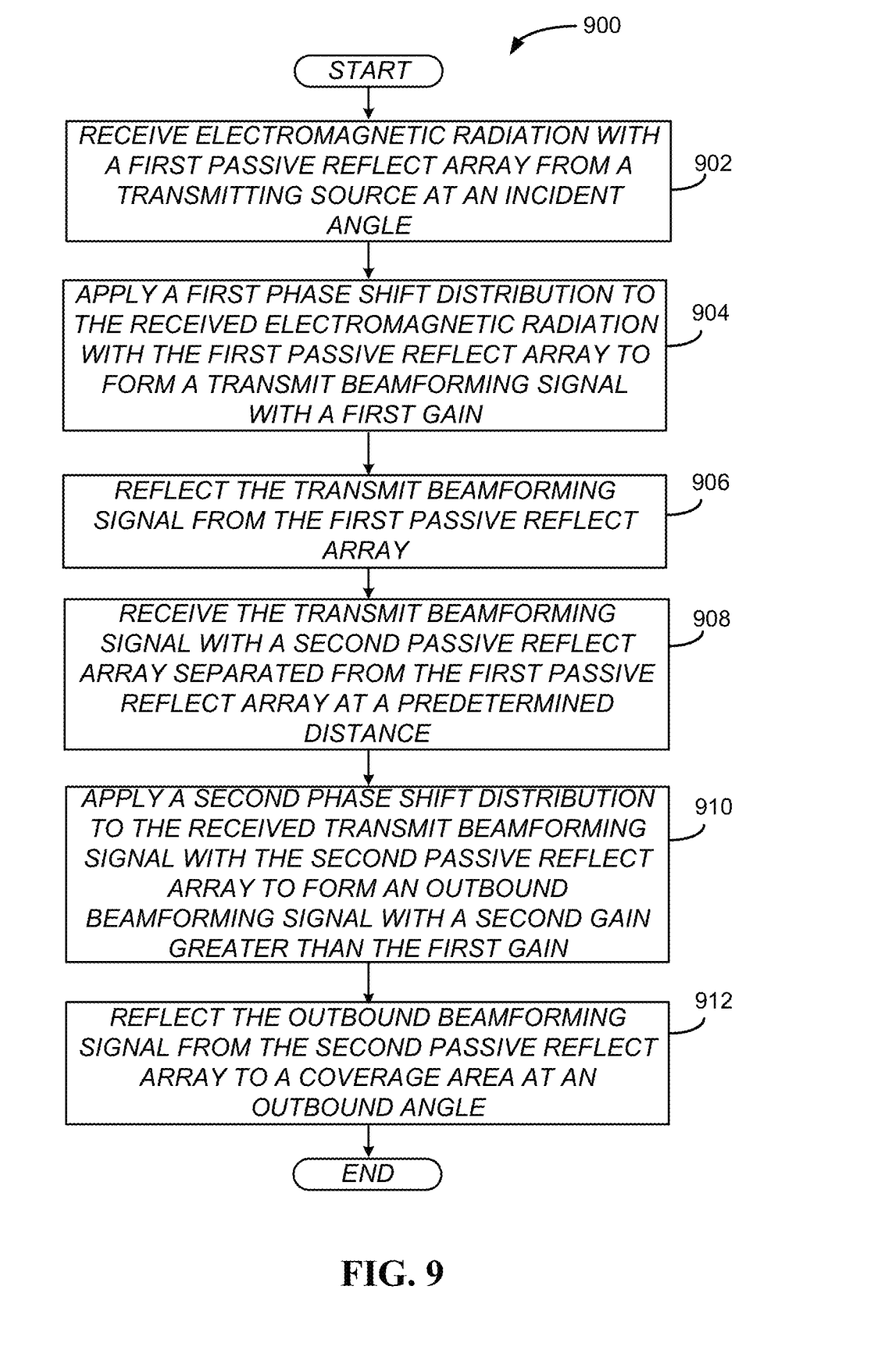
FIG. 9 illustrates a flow chart of an example process for high gain relay with multiple passive reflect array antennas, according to various implementations of the subject technology.

FIG. 9 illustrates a flow chart of an example process for high gain relay with multiple passive reflect array antennas, according to various implementations of the subject technology. For explanatory purposes, the example process 900 is primarily described herein with reference to the high gain relay antenna system 100 of FIG. 1; however, the example process 900 is not limited to the high gain relay antenna system 100 of FIG. 1, and the example process 900 can be performed by one or more other components of the high gain relay antenna system 100 of FIG. 1, including high gain relay antenna system 300 of FIG. 3 and wireless passive relay antenna system 600 of FIG. 6. Further for explanatory purposes, the blocks of the example process 900 are described herein as occurring in serial, or linearly. However, multiple blocks of the example process 900 can occur in parallel. In addition, the blocks of the example process 900 can be performed in a different order than the order shown and/or one or more of the blocks of the example process 900 are not performed.

The example process 900 begins at step 902, where electromagnetic radiation is received with a first passive reflect array from a transmitting source at an incident angle. In some aspects, the transmitting source is a base station in a downlink relay communication. In other aspects, the transmitting source is a user terminal in an uplink relay communication. Next, at step 904, the first passive reflect array applies a first phase shift distribution to the received electromagnetic radiation to form a transmit beamforming signal with a first gain. Subsequently, at step 906, the first passive reflect array reflects the transmit beamforming signal with the applied phase shifts.

Next, at step 908, the transmit beamforming signal is received with a second passive reflect array that is separated from the first passive reflect array at a predetermined distance. Subsequently, at step 910, the second passive reflect array applies a second phase shift distribution to the received transmit beamforming signal to form an outbound beamforming signal with a second gain greater than the first gain. Next, at step 912, the second passive reflect array reflects the outbound beamforming signal to a coverage area at an outbound angle.

It is also appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

Furthermore, to the extent that the term "include," "have," or the like is used in the description or the claims, such term is intended to be inclusive in a manner similar to the term "comprise" as "comprise" is interpreted when employed as a transitional word in a claim.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate implementations can also be implemented in combination in a single implementation. Conversely, various features that are described in the context of a single implementation can also be implemented in multiple implementations separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. Moreover, the separation of various system components in the aspects described above should not be understood as requiring such separation in all aspects, and it should be understood that the described program components and systems can generally be integrated together in a single hardware product or packaged into multiple hardware products. Other variations are within the scope of the following claim.

What is claimed is:

1. A high gain relay antenna system, comprising:
   a first passive reflect array configured to receive electromagnetic radiation from a transmitting source and generate a transmit beamforming signal with a first gain from the electromagnetic radiation; and
   a second passive reflect array positioned at a predetermined distance from the first passive reflect array and configured to collimate phases of the transmit beamforming signal from the first passive reflect array and transmit an outbound beamforming signal with a second gain greater than the first gain to a coverage area.

2. The high gain relay antenna system of claim 1, wherein the first passive reflect array and the second passive reflect array are separated by a predetermined distance and are geometrically positioned relative to each other and to the transmitting source to generate the outbound beamforming signal to reach the coverage area.

3. The high gain relay antenna system of claim 2, wherein the first passive reflect array and the second passive reflect array are coupled to a mount and are respectively distanced from the transmitting source by different distances.

4. The high gain relay antenna system of claim 1, wherein each of the first passive reflect array and the second passive reflect array includes a plurality of frequency selective surface patch elements.

5. The high gain relay antenna system of claim 4, wherein the plurality of frequency selective surface patch elements comprises metamaterial cells.

6. The high gain relay antenna system of claim 4, wherein the electromagnetic radiation is reflected from the plurality of frequency selective surface patch elements to form reflected electromagnetic radiation with a specific phase shift applied by the plurality of frequency selective surface patch elements, wherein one or more of the transmit beamforming signal or the outbound beamforming signal corresponds to the reflected electromagnetic radiation.

7. The high gain relay antenna system of claim 1, wherein the transmit beamforming signal is a phase-shifted version of the received electromagnetic radiation, and the first gain of the transmit beamforming signal is greater than that of the received electromagnetic radiation.

8. The high gain relay antenna system of claim 7, wherein the outbound beamforming signal is a phase-shifted version of the transmit beamforming signal.

9. The high gain relay antenna system of claim 1, wherein the first passive reflect array receives the electromagnetic radiation transmitted from the transmitting source at an incident angle and reflected as the transmit beamforming signal at an acute angle to the second passive reflect array.

10. The high gain relay antenna system of claim 1, wherein the first passive reflect array receives the electromagnetic radiation transmitted from the transmitting source at an incident angle and reflected as the transmit beamforming signal at a non-acute angle to the second passive reflect array.

11. The high gain relay antenna system of claim 1, further comprising:
    a remote-control subsystem for system level control, monitoring and status reporting for operation and maintenance of the high gain relay antenna system, wherein the remote-control subsystem is based on a cellular radio module or an Internet-of-Things node.

12. A high gain relay antenna system, comprising:
    a first passive reflect array configured to receive electromagnetic radiation from a transmitting source and generate a transmit beamforming signal with a first gain from the electromagnetic radiation; and
    a second passive reflect array configured to collimate phases of the transmit beamforming signal from the first passive reflect array and transmit an outbound beamforming signal with a second gain greater than the first gain to a coverage area based at least on the transmit beamforming signal from the first passive reflect array that is geometrically positioned relative to the second passive reflect array.

13. The high gain relay antenna system of claim 12, wherein the first passive reflect array and the second passive reflect array are separated by a predetermined distance and wherein one or more of the first passive reflect array or the second passive reflect array is excited from a near-field feed at the predetermined range that is equivalent to a focal length.

14. The high gain relay antenna system of claim 12, wherein the received electromagnetic radiation and the transmit beamforming signal received at reflect array elements of the first passive reflect array and the second passive reflect array, respectively, are phase-shifted and wherein the transmit beamforming signal and the outbound beamforming signal are aligned for a specified reflected beam pattern for far-field.

15. The high gain relay antenna system of claim 12, wherein reflect array elements of each of the first passive reflect array and the second passive reflect array apply a phase shift from a predetermined phase distribution that is calculated from the outbound beamforming signal in direction and beam-width.

16. The high gain relay antenna system of claim 12, wherein reflect array elements of the first passive reflect array introduce phase shifts to reflected signals emitted by the first passive reflect array, and wherein phases of the reflected signals from the reflect array elements are collimated by the phase shifts introduced by the reflect array elements.

17. The high gain relay antenna system of claim 12, wherein the first passive reflect array receives an incident beam that corresponds to the electromagnetic radiation from a far-field and forms a reflected beam that corresponds to the transmit beamforming signal in near-field to illuminate the second passive reflect array.

18. A method for performing high gain relay via a high gain relay antenna system comprising a first passive reflect array and a second passive reflect array, the method comprising:
- receiving electromagnetic radiation with the first passive reflect array from a transmitting source at an incident angle;
- applying a first phase shift distribution to the received electromagnetic radiation with the first passive reflect array to form a transmit beamforming signal with a first gain;
- reflecting the transmit beamforming from the first passive reflect array;
- receiving the transmit beamforming signal with the second passive reflect array separated from the first passive reflect array at a predetermined distance;
- applying a second phase shift distribution to the received transmit beamforming signal with the second passive reflect array to form an outbound beamforming signal with a second gain greater than the first gain; and
- reflecting the outbound beamforming signal from the second passive reflect array to a coverage area at an outbound angle.

19. The method of claim 18, wherein each of the first passive reflect array and the second passive reflect array includes a plurality of frequency selective surface patch elements comprising metamaterial cells.

20. The method of claim 19, wherein the electromagnetic radiation is reflected from the plurality of frequency selective surface patch elements to form reflected electromagnetic radiation with a specific phase shift applied by the plurality of frequency selective surface patch elements, wherein one or more of the transmit beamforming signal or the outbound beamforming signal corresponds to the reflected electromagnetic radiation.

* * * * *